United States Patent
Welk et al.

(10) Patent No.: US 6,848,788 B2
(45) Date of Patent: Feb. 1, 2005

(54) PROGRESSIVE SPECTACLE LENS WITH LOW MAGNIFYING DIFFERENCES

(75) Inventors: Andrea Welk, Munich (DE); Peter Baumbach, Munich (DE); Walter Haimerl, Munich (DE); Herbert Pfeiffer, Munich (DE); Gregor Esser, Munich (DE); Helmut Altheimer, Lauchdorf (DE); Rainer Dorsch, Munich (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 10/280,067

(22) Filed: Oct. 25, 2002

(65) Prior Publication Data

US 2003/0160940 A1 Aug. 28, 2003

Related U.S. Application Data

(63) Continuation of application No. PCT/DE01/01580, filed on Apr. 25, 2001.

(30) Foreign Application Priority Data

| Apr. 25, 2000 | (DE) | 100 20 244 |
| Apr. 25, 2000 | (DE) | 100 20 240 |
| Apr. 28, 2000 | (DE) | 100 21 047 |
| Jan. 17, 2001 | (DE) | PCT/DE01/00188 |

(51) Int. Cl.[7] .............................................. G02C 7/06
(52) U.S. Cl. ........................................ 351/169; 351/168
(58) Field of Search ................................. 351/168–172

(56) References Cited

U.S. PATENT DOCUMENTS 4,786,160 A * 11/1988 Furter ........................ 351/169
5,110,199 A * 5/1992 Ishida ........................ 351/169
5,926,250 A * 7/1999 Mukaiyama et al. ....... 351/168
6,019,470 A * 2/2000 Mukaiyama et al. ....... 351/169

FOREIGN PATENT DOCUMENTS

| EP | 0 627 645 A2 | 5/1994 |
| EP | 0 809 126 A1 | 11/1997 |

OTHER PUBLICATIONS

International Search Report Jun. 12, 2001 PCT/DE01/01580.

* cited by examiner

*Primary Examiner*—Jordan M. Schwartz
*Assistant Examiner*—Jessica T Stultz
(74) *Attorney, Agent, or Firm*—Crowell & Moring LLP

(57) ABSTRACT

A spectacle lens comprises a region (distance portion) designed for viewing at large distances and in particular "to infinity"; a region (near portion) designed for viewing at short distances and in particular "reading distances"; and a progressive zone disposed between the distance portion and the near portion, in which the power of the spectacle lens increases from a value at a distance reference point located in the distance portion to a value at the near reference point located in the near portion along a curve (principal line) veering towards the nose. The invention is distinguished by a combination of the following features: a change of magnification with a direction of sight is small; the magnification increases radially, starting from the distance reference point; the difference between the magnifications at the distance and near reference points is small.

6 Claims, 17 Drawing Sheets

Vertex Heights:

| 0 | -20 | -17.5 | -15 | -12.5 | -10 | -7.5 | -5 | -2.5 | 0 |
|---|---|---|---|---|---|---|---|---|---|
| 20 | 0 | 0 | 0 | 0 | 0 | 0 | 0 | 0 | 1.88114 |
| 17.5 | 0 | 0 | 0 | 0 | 0 | 1.727544 | 1.572749 | 1.476457 | 1.43867 |
| 15 | 0 | 0 | 0 | 1.825893 | 1.556258 | 1.343761 | 1.189465 | 1.093506 | 1.055966 |
| 12.5 | 0 | 0 | 1.827844 | 1.500623 | 1.231244 | 1.019591 | 0.865786 | 0.770078 | 0.732707 |
| 10 | 0 | 0 | 1.558189 | 1.232921 | 0.965089 | 0.754524 | 0.601373 | 0.505935 | 0.468649 |
| 7.5 | 0 | 1.726383 | 1.345574 | 1.022576 | 0.756795 | 0.547868 | 0.39579 | 0.300844 | 0.263672 |
| 5 | 0 | 1.566588 | 1.188478 | 0.868198 | 0.605063 | 0.398525 | 0.248337 | 0.154463 | 0.117588 |
| 2.5 | 0 | 1.459495 | 1.084527 | 0.767617 | 0.508048 | 0.305076 | 0.15802 | 0.066273 | 0.030092 |
| 0 | 1.833183 | 1.402774 | 1.031483 | 0.718726 | 0.463772 | 0.26566 | 0.123183 | 0.035027 | 0.00048 |
| -2.5 | 0 | 1.394456 | 1.027487 | 0.719736 | 0.470458 | 0.278427 | 0.141793 | 0.058484 | 0.026833 |
| -5 | 0 | 1.432945 | 1.070942 | 0.768862 | 0.525984 | 0.340808 | 0.210844 | 0.133162 | 0.105213 |
| -7.5 | 0 | 1.51707 | 1.160674 | 0.864715 | 0.628528 | 0.450405 | 0.32724 | 0.255205 | 0.230946 |
| -10 | 0 | 0 | 1.296365 | 1.00678 | 0.777293 | 0.605921 | 0.488983 | 0.42183 | 0.400599 |
| -12.5 | 0 | 0 | 1.479087 | 1.195879 | 0.972726 | 0.807223 | 0.695213 | 0.631598 | 0.61234 |
| -15 | 0 | 0 | 0 | 1.43296 | 1.214957 | 1.053701 | 0.944992 | 0.883608 | 0.86536 |
| -17.5 | 0 | 0 | 0 | 0 | 0 | 1.344445 | 1.237531 | 1.177299 | 1.159499 |
| -20 | 0 | 0 | 0 | 0 | 0 | 0 | 0 | 0 | 1.494969 |

| 0 | 2.5 | 5 | 7.5 | 10 | 12.5 | 15 | 17.5 | 20 |
|---|---|---|---|---|---|---|---|---|
| 20 | 0 | 0 | 0 | 0 | 0 | 0 | 0 | 0 |
| 17.5 | 1.459338 | 1.538288 | 1.675159 | 0 | 0 | 0 | 0 | 0 |
| 15 | 1.076827 | 1.155872 | 1.292618 | 1.4865 | 1.737064 | 0 | 0 | 0 |
| 12.5 | 0.753727 | 0.832805 | 0.969293 | 1.162491 | 1.41186 | 1.717203 | 0 | 0 |
| 10 | 0.489795 | 0.568789 | 0.704732 | 0.896843 | 1.144544 | 1.447722 | 0 | 0 |
| 7.5 | 0.28482 | 0.36345 | 0.498312 | 0.688619 | 0.933952 | 1.234434 | 1.590531 | 0 |
| 5 | 0.138583 | 0.216248 | 0.349126 | 0.536661 | 0.778744 | 1.075794 | 1.428451 | 0 |
| 2.5 | 0.050725 | 0.126539 | 0.256119 | 0.439446 | 0.677017 | 0.969632 | 1.318088 | 0 |
| 0 | 0.020498 | 0.093392 | 0.218221 | 0.395724 | 0.62728 | 0.914254 | 1.257604 | 1.658066 |
| -2.5 | 0.046199 | 0.115437 | 0.23443 | 0.404667 | 0.628679 | 0.908687 | 1.245883 | 0 |
| -5 | 0.124484 | 0.189993 | 0.302891 | 0.46531 | 0.680802 | 0.952663 | 1.282563 | 0 |
| -7.5 | 0.250899 | 0.313413 | 0.420938 | 0.576172 | 0.783244 | 1.046462 | 1.368183 | 0 |
| -10 | 0.421421 | 0.482323 | 0.585923 | 0.735457 | 0.935213 | 1.190203 | 0 | 0 |
| -12.5 | 0.633866 | 0.694298 | 0.795689 | 0.941459 | 1.135746 | 1.383841 | 0 | 0 |
| -15 | 0.887307 | 0.974892 | 1.048564 | 1.192212 | 1.38304 | 0 | 0 | 0 |
| -17.5 | 1.181572 | 1.242623 | 1.343387 | 0 | 0 | 0 | 0 | 0 |
| -20 | 0 | 0 | 0 | 0 | 0 | 0 | 0 | 0 |

Fig. 14 a

PROGRESSIVE SPECTACLE LENS WITH LOW MAGNIFYING DIFFERENCES

CROSS REFERENCE TO RELATED APPLICATIONS

The present application is a continuation of International Patent Application No. PCT/DE01/01580, filed Apr. 25, 2001, designating the United States of America, the entire disclosure of which is incorporated herein by reference. Priority is claimed based on German Patent Application Nos. 100 20 240.3, filed Apr. 25, 2000; 100 20 244.6, filed Apr. 25, 2000; 100 21 047.3, filed Apr. 28, 2000; and International Patent Application No. PCT/DE01/00188, filed Jan. 17, 2001.

FIELD OF THE INVENTION

The invention relates to a progressive spectacle lens as set out in the preamble of patent claim 1, having low differences of magnification between the distance portion and the near portion.

Progressive spectacle lenses (also called varifocal lenses, multifocal lenses etc.) are usually understood to be spectacle lenses having a different (lower) power in the region through which a spectacles wearer views an object located at a great distance—hereunder referred to as a distance portion—than in the region (near portion) through which the spectacles wearer views a near object. Located between the distance portion and the near portion is the so-called progressive zone in which the power of the spectacle lens continuously increases from that of the distance portion to that of the near portion. The magnitude of the power increase is also designated as addition power.

As a rule, the distance portion is located in the upper part of the spectacle lens and designed for viewing "to infinity", whilst the near portion is located in the lower region and is particularly designed for reading. In spectacles for special application—those for pilots or for monitor work stations are mentioned as examples—the distance and near portions may also be arranged differently and/or designed for other distances. Furthermore, it is possible for a plurality of near portions and/or distance portions and suitable progressive zones to be present.

With progressive spectacle lenses having a constant refractive index it is necessary, in order that the power may increase between the distance portion and the near portion, that the curvature of one or both surfaces continuously change from the distance portion to the near portion.

The surfaces of spectacle lenses are usually characterized by the so-called principal radii of curvature R1 and R2 at every point on the surface. (Sometimes also the principal curvatures K1=1/R1 and K2=1/R2 are given instead of the principal radii of curvature.) Together with the refractive index of the glass material, the principal radii of curvature govern the parameters frequently used for an ophthalmologic characterization of a surface:

Surface power=$0.5 \cdot (n-1) \cdot (1/R1+1/R2)$

Surface astigmatism=$(n-1) \cdot (1/R1-1/R2)$.

Surface power is the parameter via which an increase of power from the distance portion to the near portion is achieved. Surface astigmatism (more clearly termed cylinder power) is a "troublesome property", because an astigmatism—inasmuch as an eye does not have an innate astigmatism to be corrected—which exceeds a value of about 0.5 dpt results in an indistinctly perceived image on the retina.

BACKGROUND OF THE INVENTION

Because of the different powers in the distance and near portions, different magnifications necessarily result in the near and distance portions, which are disturbing to the spectacles wearer.

In EP-A-0 809 126 a progressive spectacle lens is described in which the differences of magnification between the near and distance portions are to be reduced.

For this, formulae are used for the computation of the magnification which—as has been realized in the present invention—are not suitable for computing the magnification at any desired position of a progressive spectacle lens. Namely, the basis of the formulae used in EP-A-0 809 126 is a centered optical system in which the principal ray passes through the spectacle lens without being refracted. For this, attention is drawn to the textbook by Josef Reiner "Auge und Brille" (="Eye and Spectacles"), to which reference is expressly made concerning an explanation of all terms which are not described here in more detail.

Before dealing more closely with the invention, attention will be given to the formulae used in EP-A-0 809 126:

The classical formulae as used in EP-A-0 809 126 for the magnification $\Gamma$ of a centered afocal system, are:

$$\text{Magnification } \Gamma = N = \frac{\tan w'}{\tan w} = \frac{\frac{h}{f_2'}}{\frac{h}{f_1'}} = \frac{f_1'}{f_2'} = \frac{f_1'}{f_1' - e} = \frac{1}{1 - eD1}$$

$$\text{Scale (lateral) } \beta' = \frac{y'}{y} = \frac{f_2' \tan wo}{f_1' \tan wo} = \frac{f_2'}{f_1'} = \frac{1}{\Gamma}$$

Total magnification Ng of an afocal System consisting of a fully corrected spectacle lens and a refraction deficit $$Ng = \frac{1}{1 - \bar{e} D_{Br}} = 1 + \bar{e} A_R$$

$$Ng = Ne \cdot Ns$$

wherein:

$D_{Br}$ is the power of the spectacle lens
$A_R$ is the distance point refraction of the eye
$\bar{e}$ is the distance between the image side principal plane of the spectacle lens and the object side principal plane of the eye System magnification Ns of an afocal System consisting of a thin spectacle lens and a refraction deficit $$Ns = \frac{1}{1 - e^* S'}$$

wherein:

S' is the vertex power of the spectacle lens
e' is the distance from the image side vertex of the spectacle lens to the principal plane of the eye.

Shape factor of an afocal System consisting of an "imaginary" afocal spectacle lens having the same front surface power and thickness $$Ne = \frac{1}{1 - \frac{d}{n}D_1}$$

wherein:

$D_1$ is the surface power of the front surface d is the thickness of the spectacle lens n is the refractive index of the spectacle lens.

For a detailed explanation of the assumptions made and the parameters used, attention is drawn to FIG. 1 in which the model of a centered afocal optical system and the magnifications resulting with this system are graphically illustrated.

DESCRIPTION OF THE INVENTION

According to the invention it has been realized that the above-mentioned formulae which are applicable to centered optical systems, lead to incorrect results for spectacle lenses when the magnification at the vertex is not to be computed.

This will be more closely described in the following with reference to FIGS. 2 and 3.

The magnification is defined as the ratio of the retinal image size when spectacles are worn to the retinal image size without spectacles.

As will be seen from FIGS. 2 and 3, the retinal image size is equal to the product of the focal length of the eye and the tangent of the angle of sight. From this follows:

$$\Gamma = \frac{\tan w'}{\tan w}$$

To now obtain the needed values, namely the object side and image side angles of sight, a central principal ray passing through the center of rotation of the eye Z' must be computed. This is directed onto the center of the fovea. Next, the location of the entrance pupil of the eye must be computed, and subsequently also one (or more) rays which pass through the middle of the entrance pupil and have an image side angle of sight which slightly differs from the principal ray. The angles between this ray and the central principal ray then give the angle of sight.

It is also possible to allow the rays to pass through Z' instead of through the center of the entrance pupil. This gives the magnification of the angle of sight.

The differences between the formula used in prior art and the exact computation performed in accordance with the invention will be demonstrated by means of an example of a single vision lens having a spherical power sph=0.5 dpt, a refractive index n=1.604, a front surface with a power D1=4.89 dpt and a center thickness d=1.54 mm and also e=15 mm:

For a lens of this kind the total magnification is

Ng=1.32.

Both the classical formula and the correct computation give for the magnification [%] at the vertex {x=0; y=0} the value 1.34.

As distinct from this, the magnification [%] at the periphery {x=20, y=20} according to the classical formula is 1.65, whilst the correct computation gives the value 3.18.

The classical formula gives correct results at the vertex—as would not be otherwise expected with the initial premises—however, the classical formula fails at the periphery because of the premises made.

For a progressive spectacle lens the deviations are even larger.

As an example, a progressive spectacle lens will be considered, having a spherical power sph=+0.5 dpt, an addition power Add=2.5 dpt, and a surface power D1=5.18 dpt at the distance reference point, as well as a thickness d=2.57 mm and e=15 mm.

For the magnification [%] at the distance reference point {x=0; y=8} the classical formula gives 1.67, whilst the correct computation gives the value 2.04. At the near reference point {x=2.5; y=−14} the percentage magnification amounts to 6.67 according to the classical formula, whilst the correct computation gives 7.48.

In this, differences not only of the absolute values of the magnification result, but also of the structure of the distribution of the magnification:

In FIG. 4 the iso-lines for the magnification calculated according to the classical formula and according to the correct computation are shown in comparison.

Thus, the statements given in EP-A-0 809 126 concerning the magnification are incorrect.

As has been recognized according to the invention, it is by far not sufficient to superimpose the progressive surface on the back surface in order to obtain a spectacle lens with low differences of magnification at the distance and near reference points.

The invention is based on the object of describing a progressive spectacle lens as set out in the preamble of patent claim 1, in which the differences between the magnifications of the distance portion and the near portion are distinctly smaller when compared with the prior art. Furthermore, according to the invention a series of spectacle lenses is to be described for which the differences between progressive spectacle lenses of different powers or and/or addition powers have been distinctly reduced when compared with prior art.

Achievements of this object in accordance with the invention are set out in the independent patent claims. Further developments of the invention form the subject matter of the dependent claims.

In order to achieve dynamic sight which is as acceptable as possible, the magnification must satisfy certain conditions:

The magnification must be as low as possible.

1. Any change of magnification with a direction of sight must be as small as possible.
2. The magnification must increase radially as far as possible, as in the case of single-vision lenses.
3. The difference between the magnifications at the distance and near reference points must be as small as possible.

BRIEF DESCRIPTION OF THE DRAWINGS

In the following the invention will be described by way of example, without limitation of the general inventive concept, with the aid of embodiments with reference to the drawings to which attention is expressly drawn concerning the disclosure of all details of the invention not described more explicitly in the text.

Shown by

FIG. 14a are the vertex heights of the progressive surface of a concrete embodiment;

DESCRIPTION OF EXAMPLES OF EMBODIMENT

Figure 1:
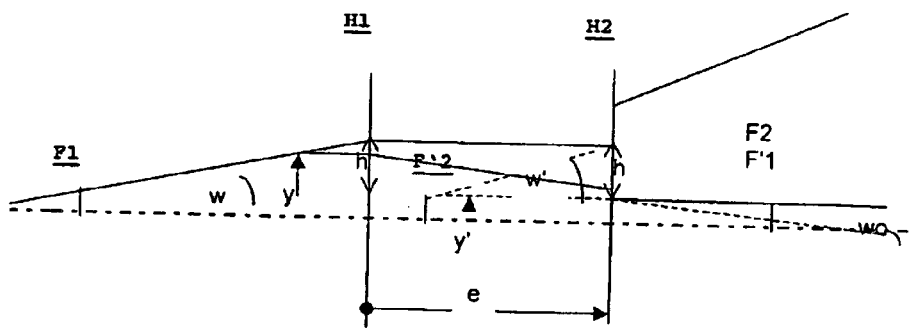
FIG. 1 is a drawing to explain the derivation of the classical formula.
Figure 2:
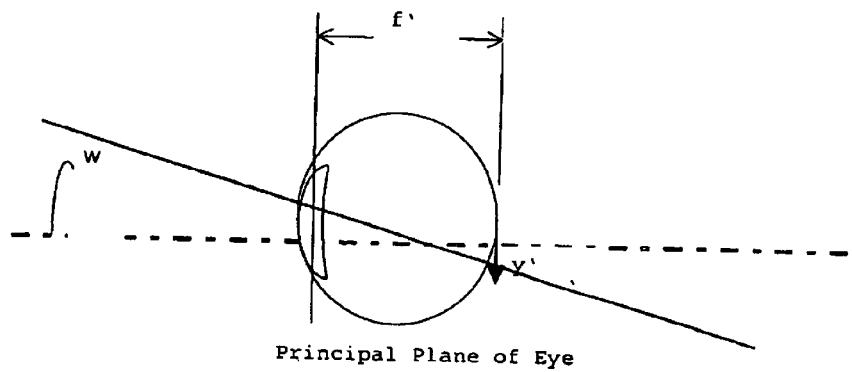
FIG. 2 is a drawing to explain the correct computation of the magnification.
Figure 3:
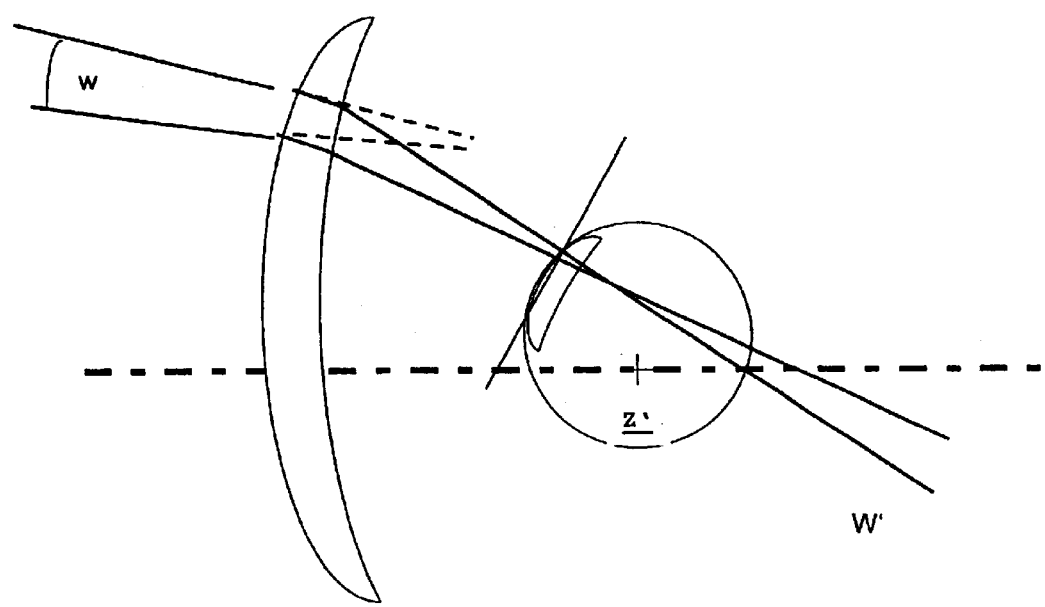
FIG. 3 is a drawing to explain the computation of the off-axis magnification.
Figure 4:
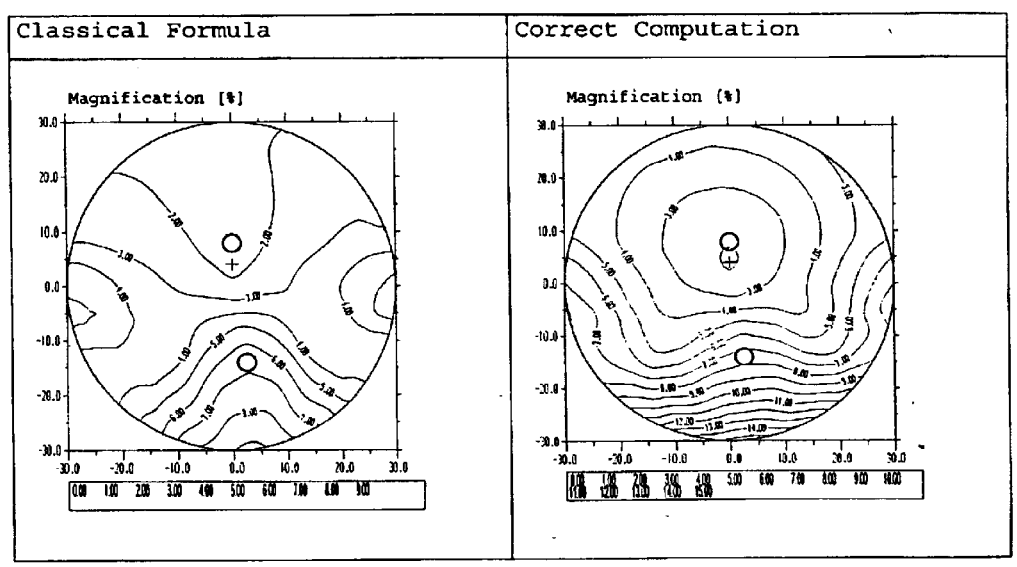
FIG. 4 is a comparison of the magnification values as obtained with the classical formula and by the correct computation.
Figure 5:
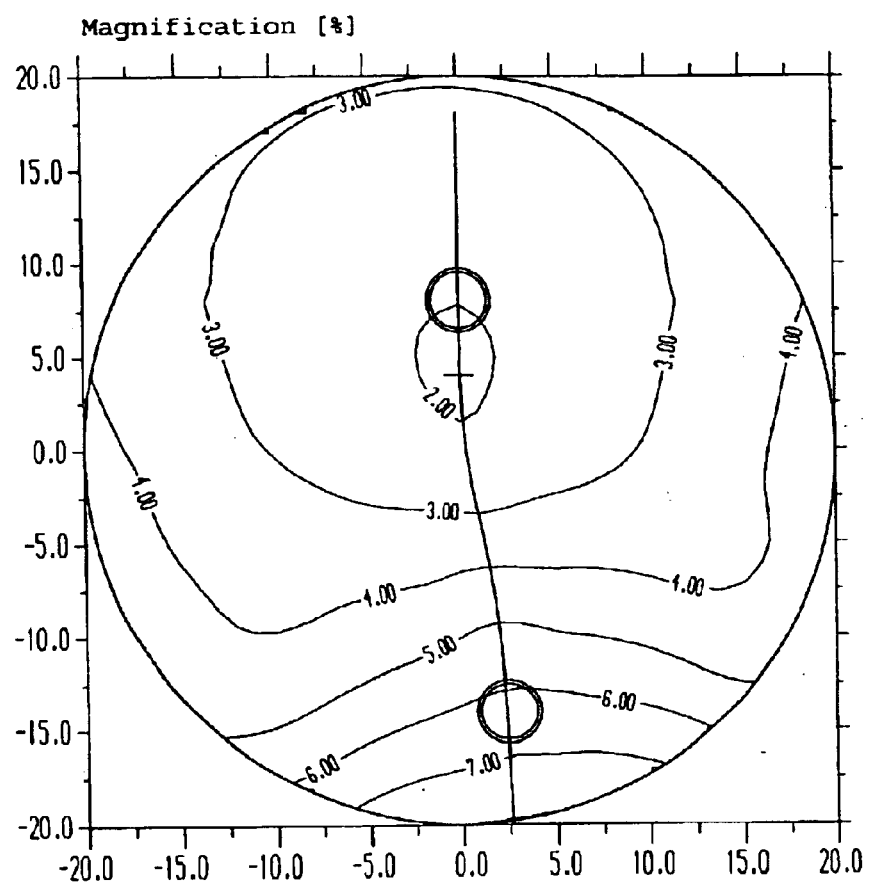
FIG. 5 is the magnification for each direction of sight for an embodiment of the invention.

FIG. 5 shows the magnification for each direction of sight for an embodiment of the invention. Plotted are the "iso-lines" of the magnification as a function of the coordinates (x, y) of the points of penetration of the principal rays through the front surface.

The spectacle lens according to the invention as shown in FIG. 5 has the values sph +0.5 dpt and addition power Add 2.0 dpt.

The uniform change of the magnification and the single-power-like course of the iso-lines can be recognized:

The iso-lines extend in a significantly more concentric manner than in prior art. Furthermore, the differences and also the absolute values of the magnification at the distance reference point and the near reference point are very small, as is also the difference of the magnification between the distance reference point and the near reference point. The magnification is 2.0% at the distance reference point and 6.3% at the near reference point, and thus the difference is only 4.3%.

Figure 6:
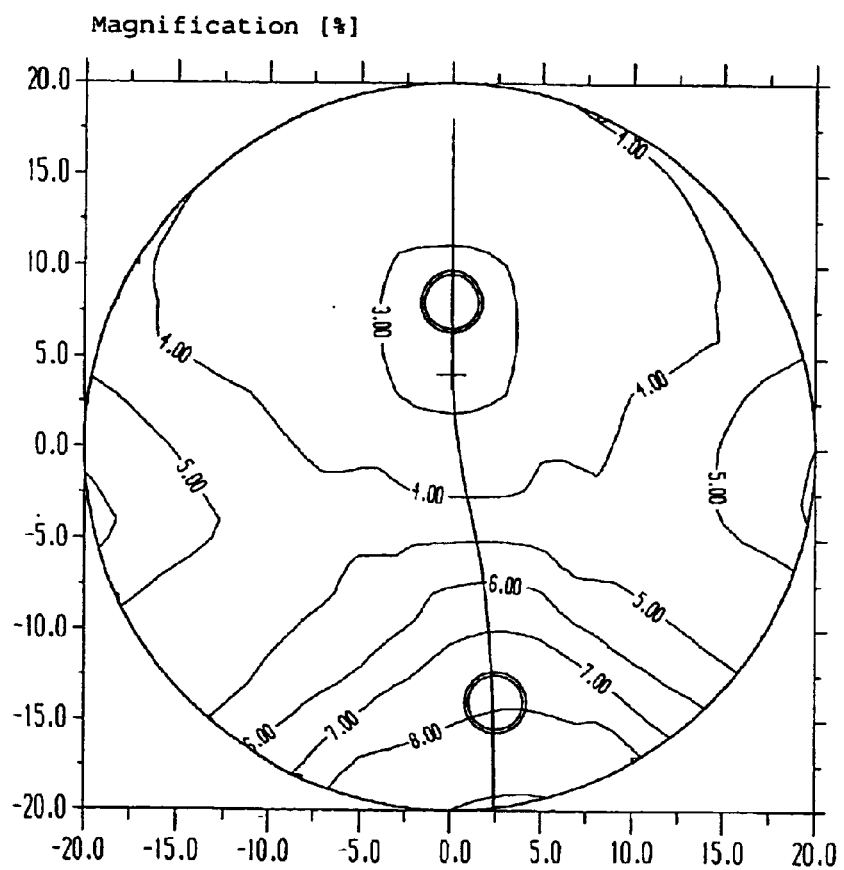
FIG. 6 is, by way of comparison, the magnification of a conventional spectacle lens having the same power and addition power.

FIG. 6 shows by way of comparison the magnification of a conventional spectacle lens of the same power and addition power. The magnification is altogether larger and the iso-lines extend less concentrically, i.e. less single-vision-like, than in the invention.

The magnification is 2.8% at the distance reference point and 7.9% at the near reference point, and thus the difference is 5.1%.

Figure 7:
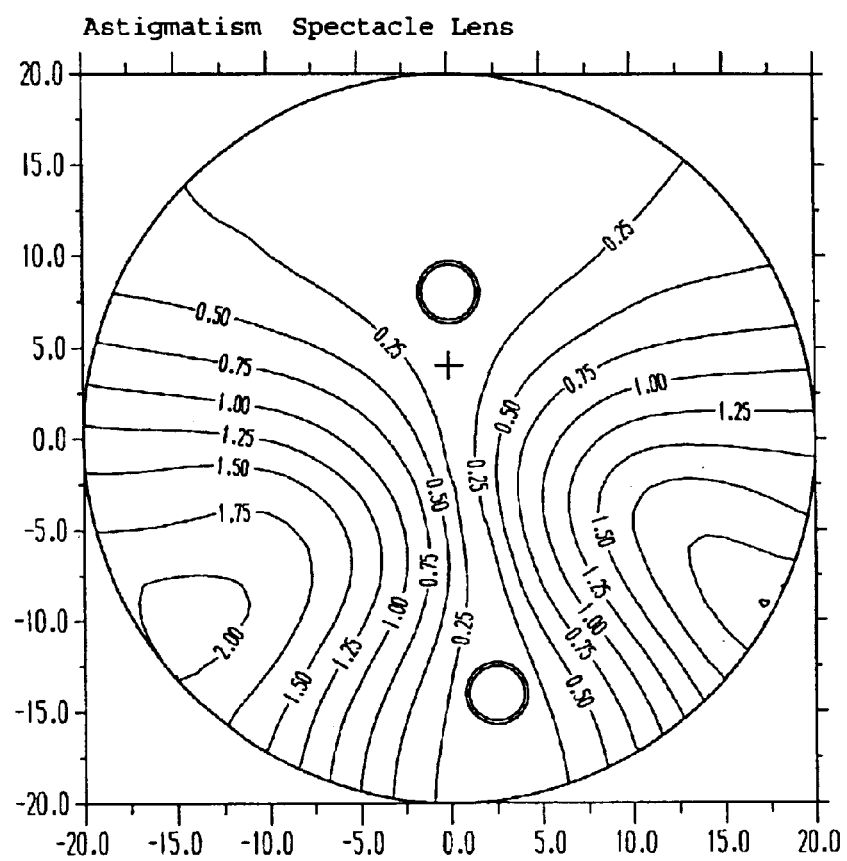
FIGS. 7 and 8 are the astigmatic deviation and the mean "as worn" power of the embodiment shown in FIG. 5.
Figure 8:
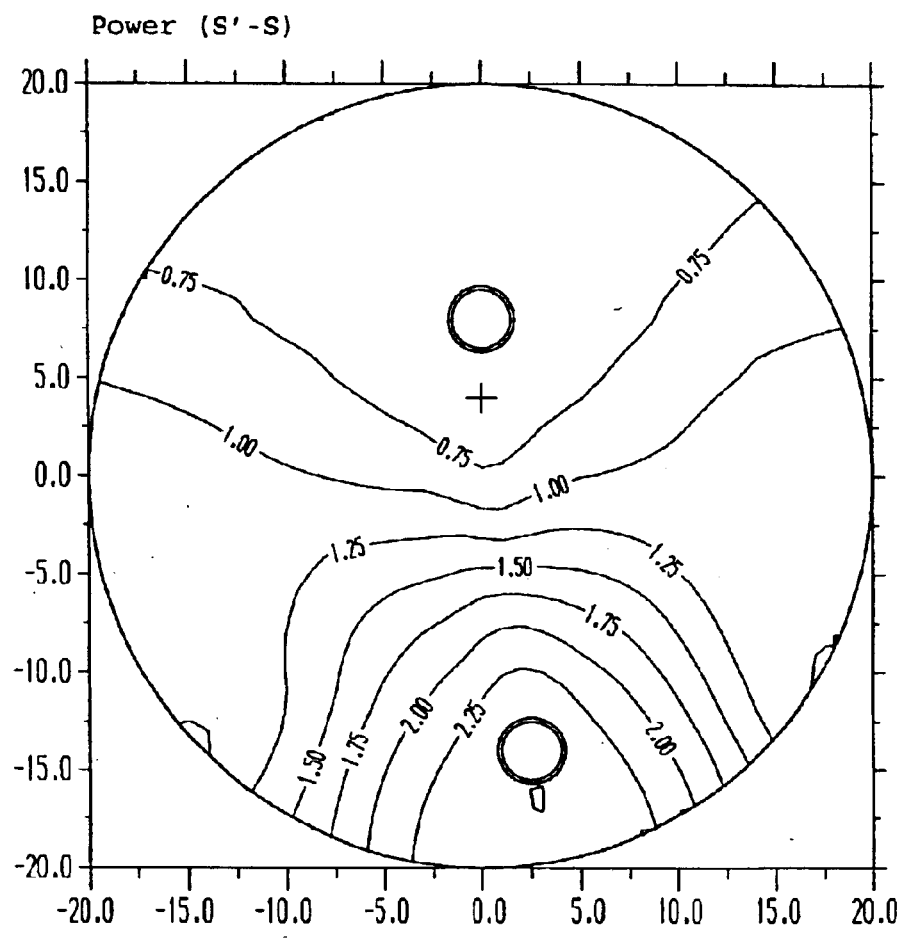
Figure 9:
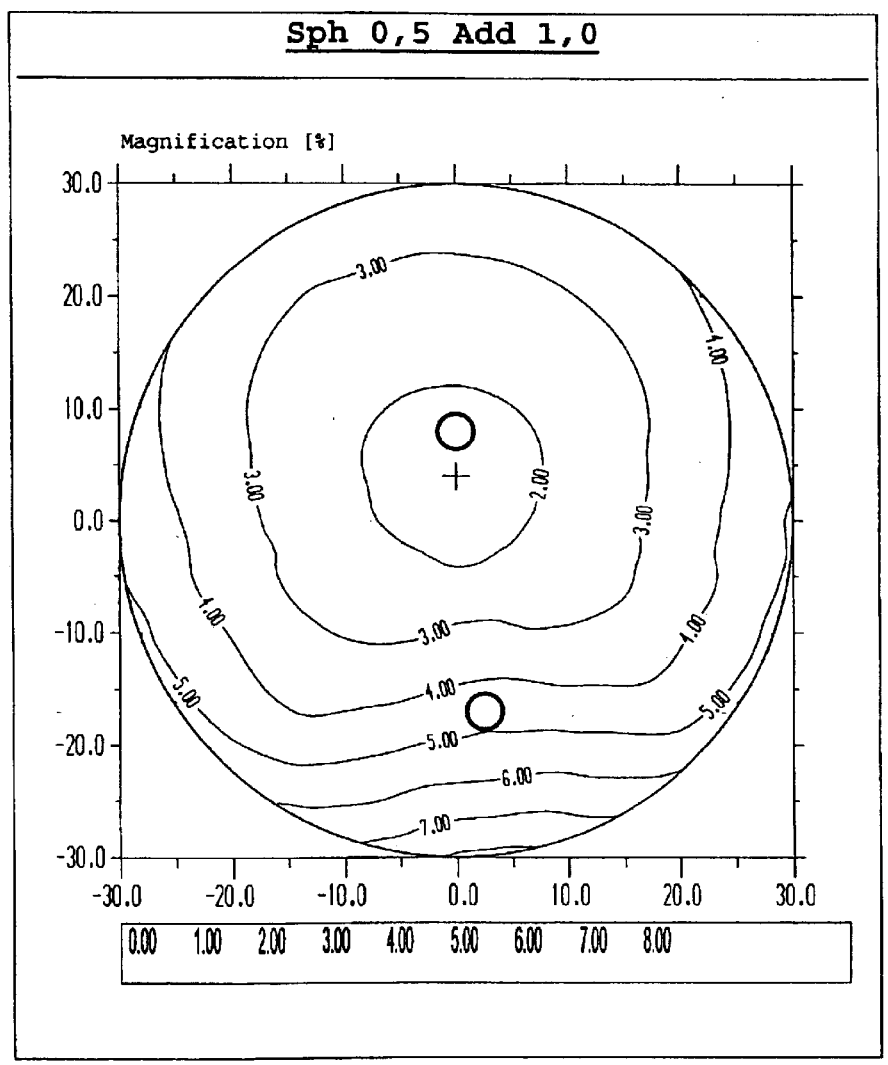
FIGS. 9 to 13 are the magnifications of embodiments according to the invention for various powers.
Figure 10:
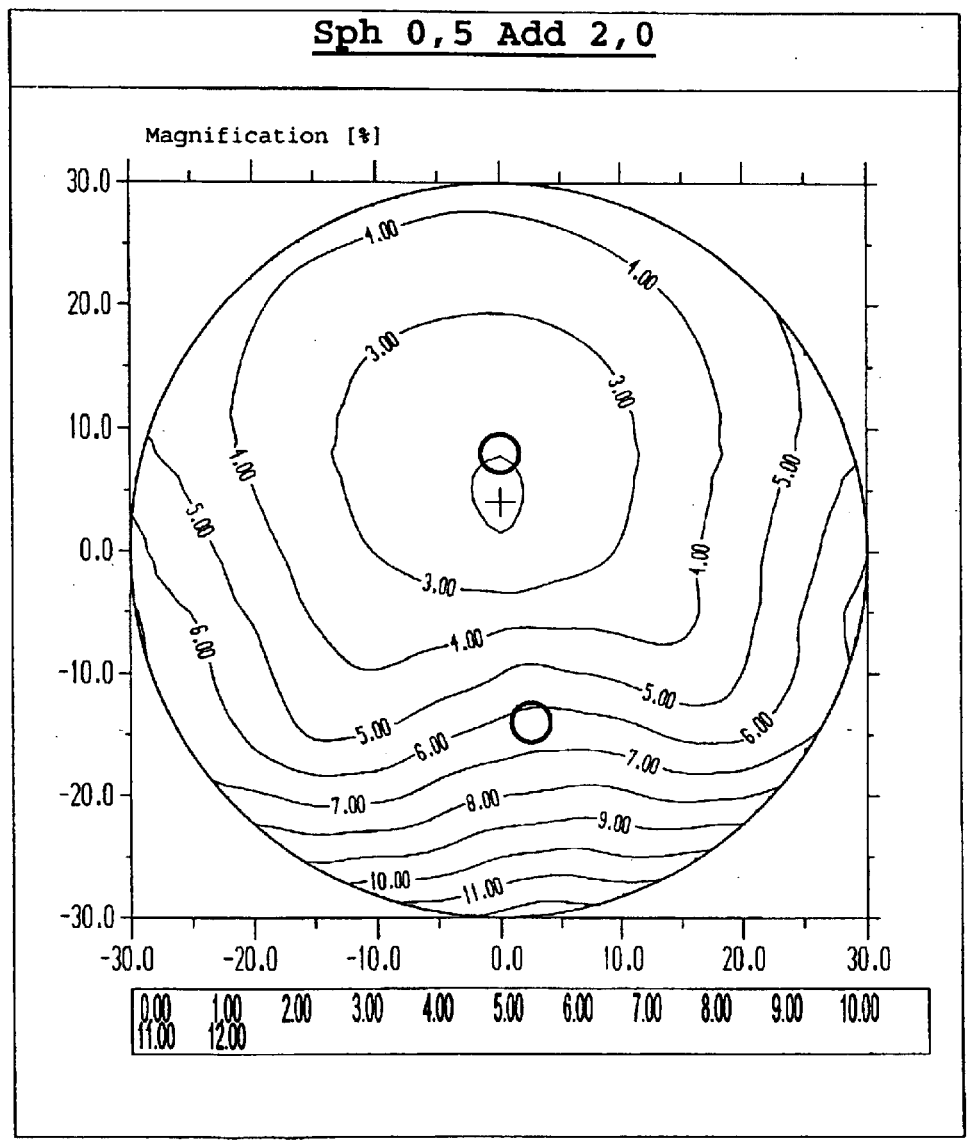
Figure 11:
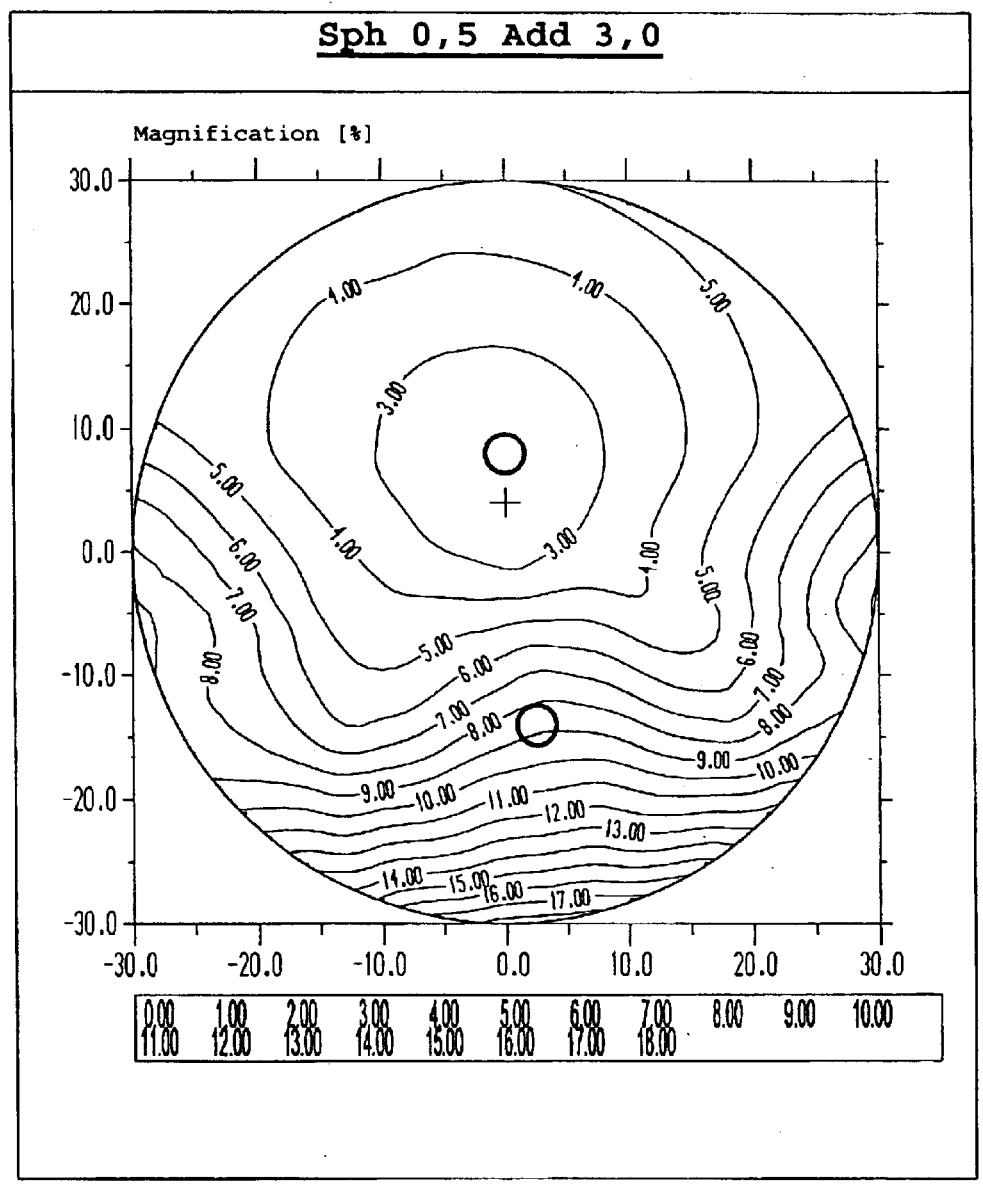
Figure 12:
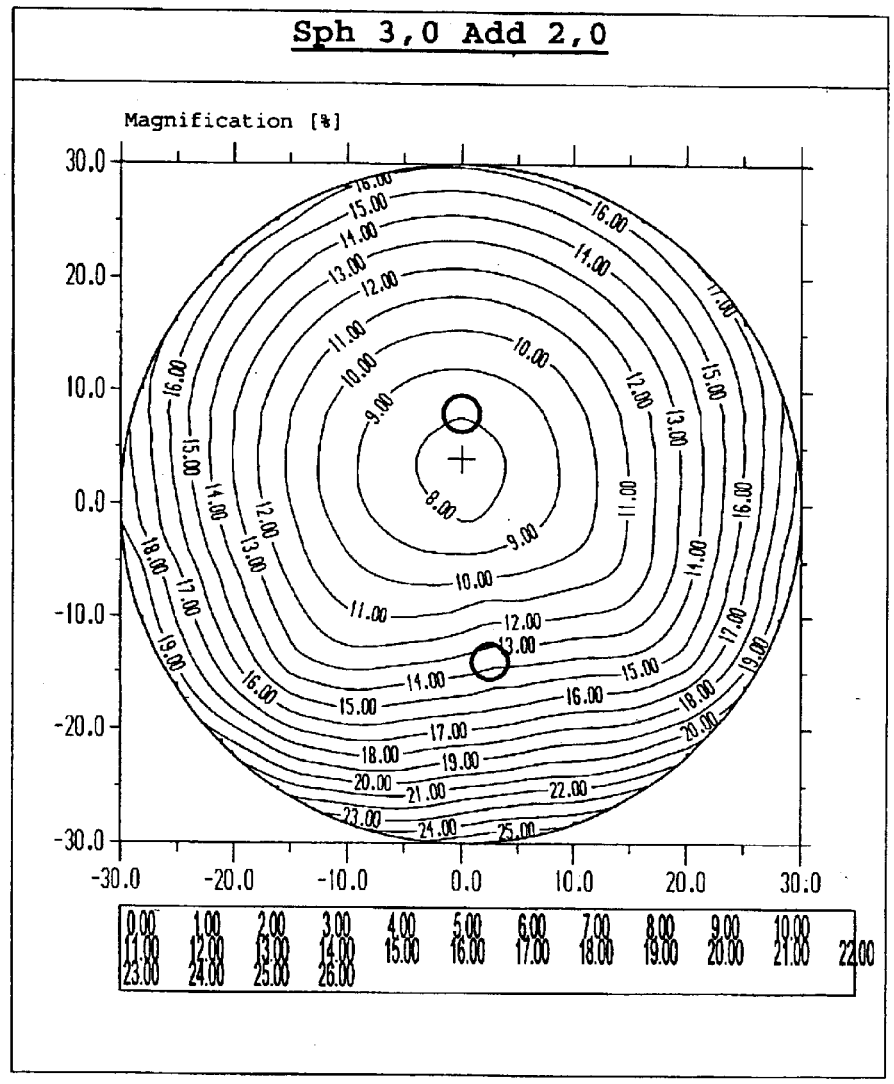
Figure 13:
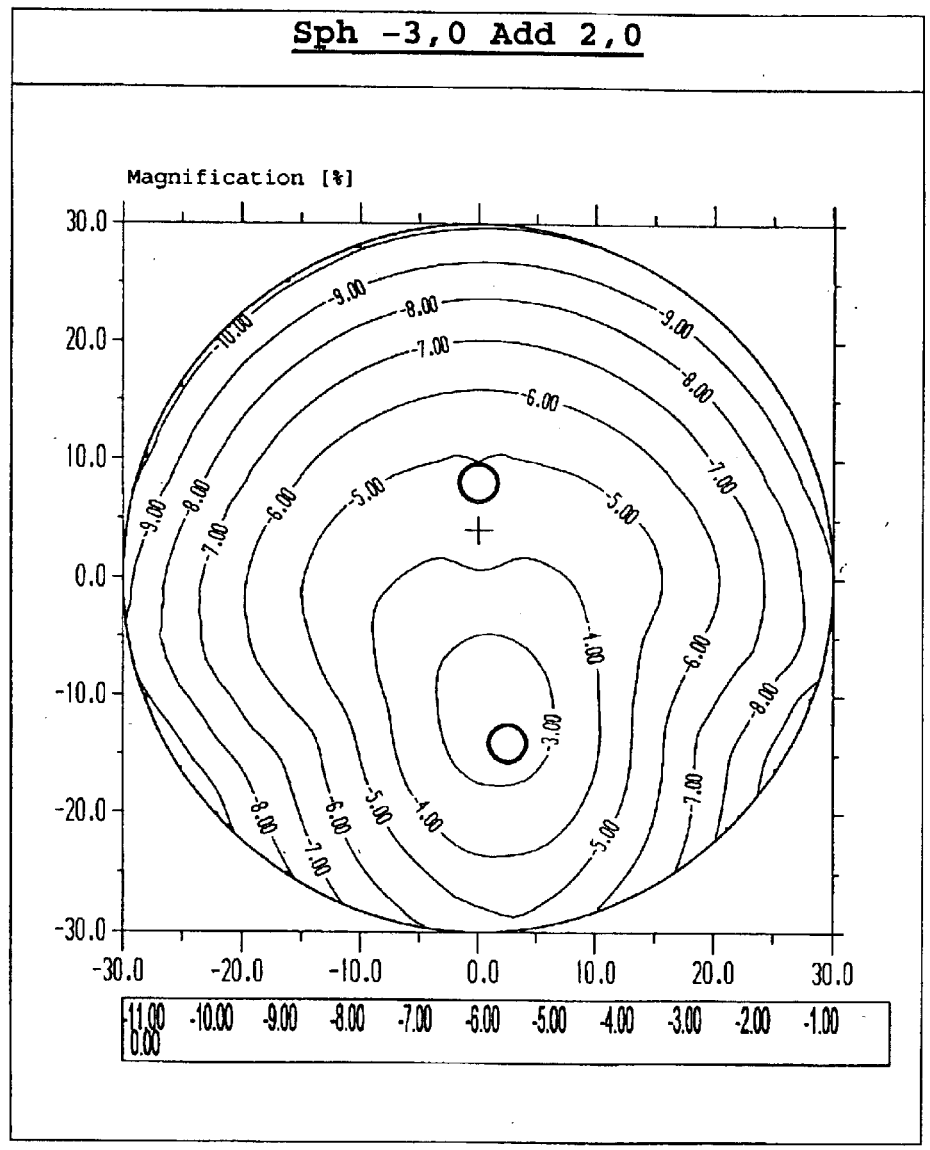

FIGS. 7 and 8 show the astigmatic deviation and the mean "as worn" power of this embodiment of the invention within a circle having a radius of 20 mm around a point lying 4 mm below the so-called centration point. The distance reference point and the near reference point are marked with circles; their positions may be seen in the respective Figures.

In FIG. 7 the so-called astigmatic deviation, i.e. the "residual astigmatism" of the system spectacle lens/eye is shown by means of so-called iso-lines, beginning with the iso-line 0.25 dpt. The iso-lines indicate the deviation of the astigmatism with respect to magnitude and cylinder axis from the cylindrical prescription—which in the case of an astigmatism-free eye is 0 dpt.

In FIG. 8 the mean "as worn" power D, i.e. the mean value of the reciprocal of the image-side focal intercepts S'1 and S'2 minus the object distance which is the object side focal intercept S, as given by $$D=0.5 \cdot (S'1+S'2)-S$$

is also shown in the form of so-called iso-lines beginning with the iso-line 0.75 dpt.

FIGS. 7 and 8 show that the distance portion and also the near portion are relatively large. Furthermore, the mean "as worn" power hardly increases towards the periphery in the distance portion, and decreases only slightly in the near portion. The maximum astigmatic deviation is very small, the difference between the nasal and temporal maximum deviation being insignificant.

In all Figures the abscissa (x axis) is the horizontal axis and the ordinate (y axis) is the vertical axis in the wearing position.

FIGS. 9 to 13 show the magnification of embodiments of the invention having different powers, here illustrated for a circle having a radius of 30 mm around a point lying 4 mm vertically below the centration point. The powers and the addition powers are each indicated in the Figures.

The concrete embodiment described in FIG. 14 has a spherical power (mean "as worn" power) of −1 dpt and an addition power of 2 dpt at the distance reference point. An astigmatic prescription is not present. In all Figures the abscissa (x axis) is the horizontal axis and the ordinate (y axis) is the vertical axis in the wearing position.

The distance and the near reference point are each represented by a circle in FIGS. 14b–e, the centration point being represented by a cross—their positions may be seen from the Figures. Furthermore, the course of the principal line has been drawn.

The partial FIG. 14a indicates the vertex height of the progressive eye side surface for the embodiment. Vertex height is understood to be the distance of a point having the coordinates x and y (horizontal and vertical axis, respectively, in the wearing position of the spectacle lens) from the tangential plane of the surface vertex. In the Table each left-hand column indicates the y values (from −20 to +20 mm) and the top line from column 2 onwards indicates the x values (from −20 to +20 mm). The vertex heights also are given in millimeters. The value 0 means that no vertex height is given for these x,y coordinates.

Figure 14B:
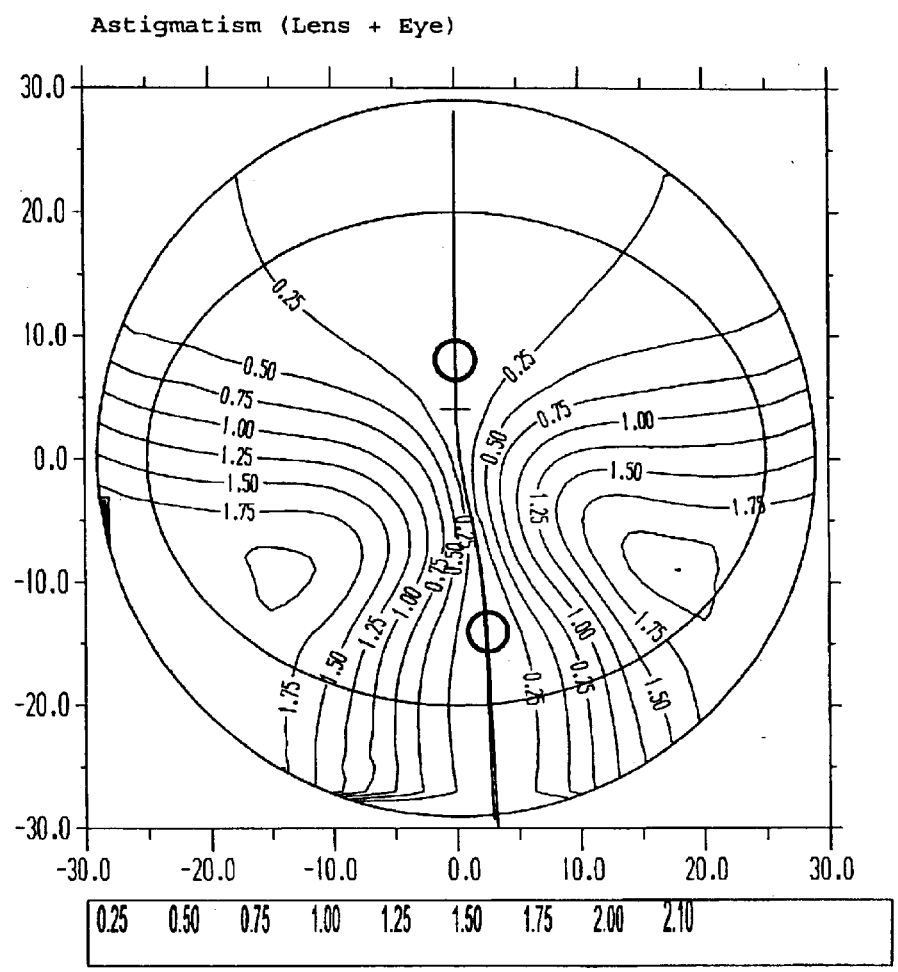
FIG. 14b are the iso-lines of the astigmatic deviation.

The partial FIG. 14b shows the astigmatic deviation within a circle having a radius of 30 mm around a point lying 4 mm below the so-called centration point. The astigmatic deviation is the "residual astigmatism" of the system spectacle lens/eye and is represented by so-called iso-lines beginning with the iso-line 0.25 dpt. The iso-lines indicate the deviation of the astigmatism with respect to magnitude and cylinder axis from the cylindrical prescription—which in the case of an astigmatism-free eye is 0 dpt.

Figure 14C:
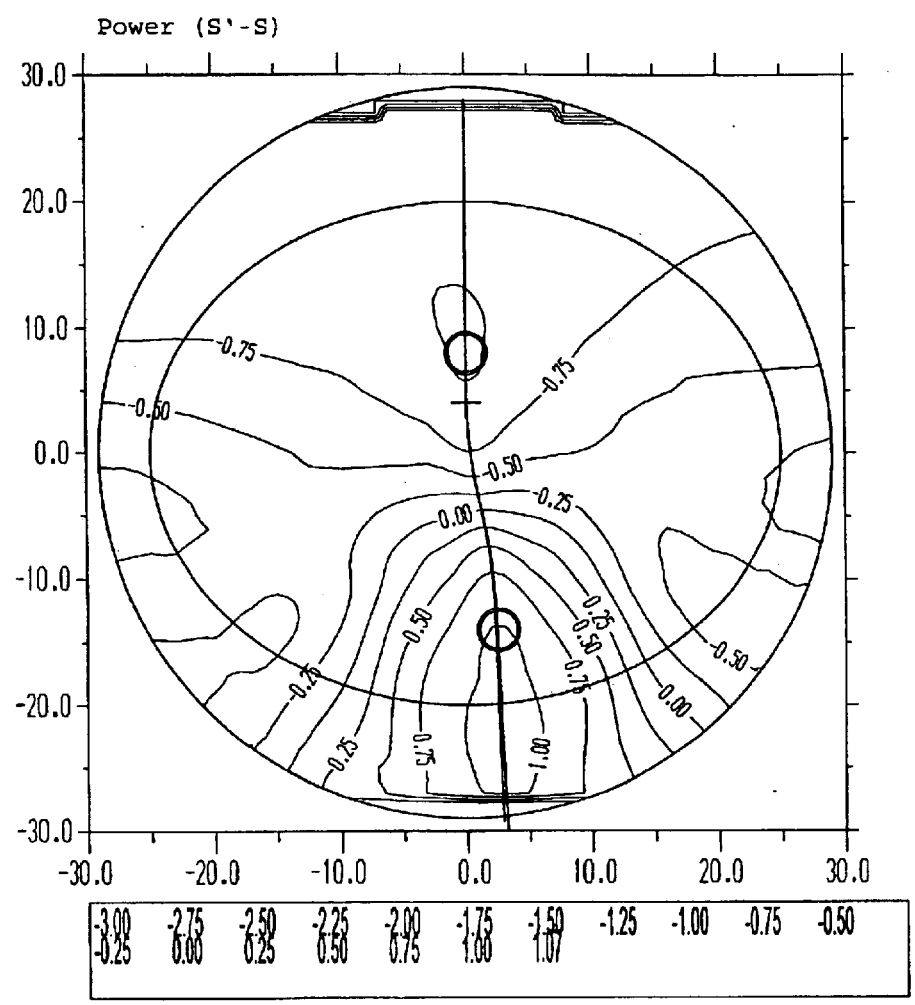
FIG. 14c are the iso-lines of the mean "as worn" power.

The partial FIG. 14c shows in corresponding manner the iso-lines for the mean "as worn" power of this embodiment. The mean "as worn" power D is the mean value of the reciprocals of the image side focal intercepts S'1 and S'2 minus the object distance which is the object side focal intercept S, as given by $$D=0.5 \cdot (S'1+S'2)-S$$

and is also illustrated in the form of so-called iso-lines beginning with the iso-line 0.75 dpt.

Figure 14D:
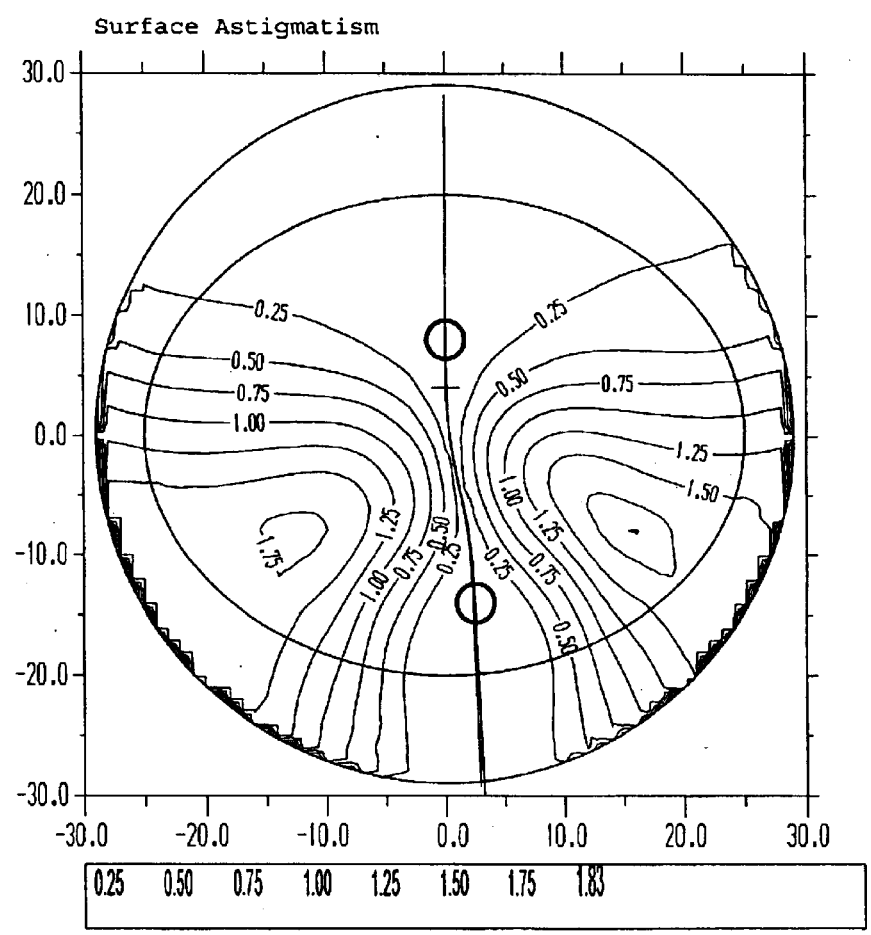
FIG. 14d are the iso-lines of the surface astigmatism.
Figure 14E:
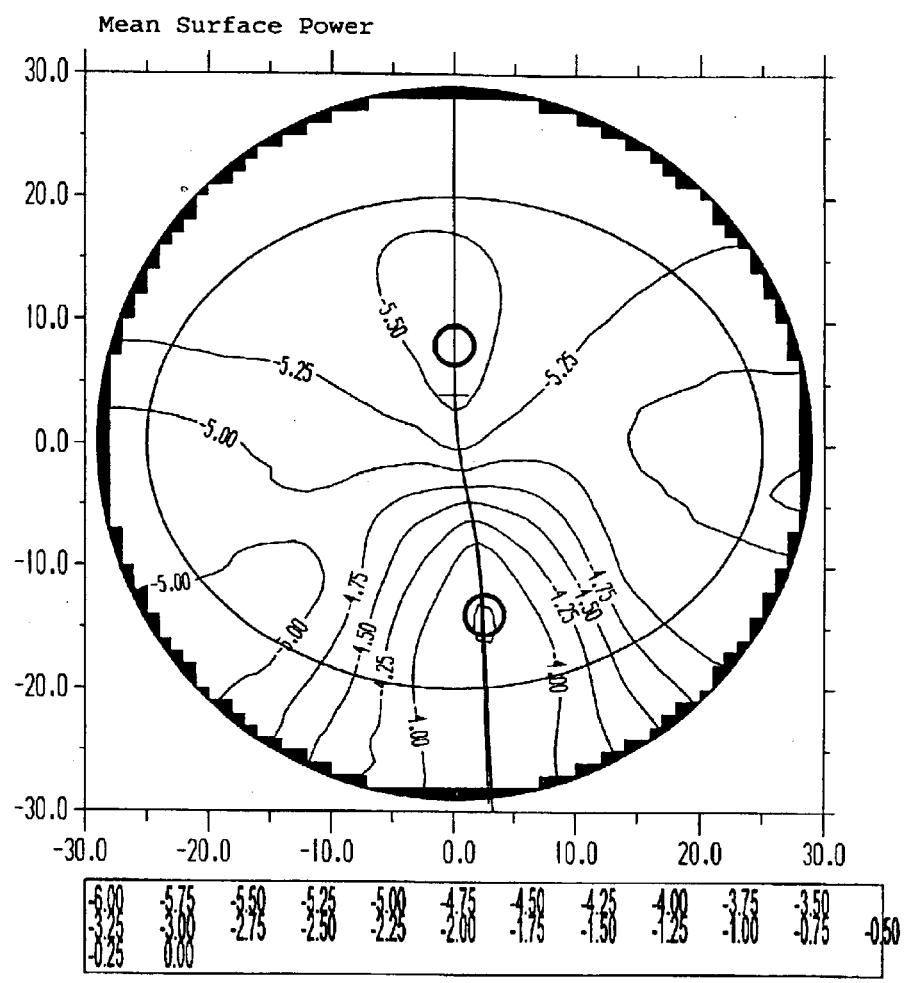
FIG. 14e are the iso-lines of the mean surface power for this embodiment.

In corresponding manner the iso-lines of the surface data, namely the surface astigmatism and the mean surface power are shown in partial FIGS. 14d and 14e. For a definition of these surface data attention is drawn to the introductory explanations.

The embodiment shown in FIG. 14 has the following individualized conditions of wearing:

| | |
|---|---|
| D1x | 4.55 |
| D1y | 4.55 |
| n | 1.597 |
| D | 1.59 |
| DRP | 1.0 |
| PD | 63 |
| HSA | 15 |
| Pantoscopic Angle | 0 | wherein:

D1x is the surface power of the front surface in x direction (dpt)

D1y is the surface power of the front surface in y direction (dpt)

n is the refractive index of the glass material

D is the center thickness of the lens in mm

DRP is the prism thinning in cm/m

PD is the interpupillary distance

HSA is the vertex distance in mm

The pantoscopic angle of the spectacle lens is given in degrees.

The following properties are common to all illustrated embodiments of the invention:

The magnification at the distance reference point is very small. Table 1 shows the magnification for some embodiments of the invention.

TABLE 1

Magnification [%] at the Distance Reference Point

| | Add = 1.0 | Add = 1.5 | Add = 2.0 | Add = 2.5 | Add = 3.0 |
|---|---|---|---|---|---|
| Do = −4.0 | −6.5 | −6.5 | −6.5 | −6.5 | −6.5 |
| Do = −3.0 | — | — | −4.7 | — | — |
| Do = −2.0 | −3.1 | −3.1 | −3.1 | −3.1 | −3.1 |
| Do = 0 | 0.7 | 1.0 | 1.1 | 1.1 | 1.2 |
| Do = 0.5 | 1.8 | 1.9 | 2.0 | 2.1 | 2.2 |
| Do = 2.0 | 5.4 | 5.5 | 5.5 | 5.9 | 5.9 |
| Do = 3.0 | — | — | 8.0 | — | — |
| Do = 4.0 | 10.4 | 10.8 | 10.9 | 11.0 | 11.2 |

In this the addition power Add is the difference of the mean "as worn" powers at the near and distance reference points, and Do is the mean "as worn" power at the distance reference point.

The magnification at the near reference point is likewise very small. Table 2 shows the magnification for some embodiments of the invention.

TABLE 2

Magnification [%] at the Near Reference Point

| | Add = 1.0 | Add = 1.5 | Add = 2.0 | Add = 2.5 | Add = 3.0 |
|---|---|---|---|---|---|
| Do = −4.0 | −7.5 | −6.4 | −4.9 | −3.8 | −3.0 |
| Do = −3.0 | — | — | −2.6 | — | — |
| Do = −2.0 | −2.8 | −1.6 | −0.3 | 0.9 | 1.8 |
| Do = 0 | 2.9 | 4.0 | 5.1 | 6.3 | 7.5 |
| Do = 0.5 | 4.7 | 5.6 | 6.4 | 7.5 | 8.8 |
| Do = 2.0 | 9.3 | 10.0 | 10.7 | 12.0 | 13.4 |
| Do = 3.0 | — | — | 13.7 | — | — |
| Do = 4.0 | 16.0 | 16.5 | 17.0 | 18.5 | 19.9 |

The minimum magnification in a region within a circle of 40 mm diameter around a point lying 4 mm vertically below the centration point is likewise very small. Table 3 shows the magnification for some embodiments of the invention.

TABLE 3

Minimum Magnification [%]

| | Add = 1.0 | Add = 1.5 | Add = 2.0 | Add = 2.5 | Add = 3.0 |
|---|---|---|---|---|---|
| Do = −4.0 | −9.7 | −9.6 | −9.6 | −9.5 | −9.5 |
| Do = −3.0 | — | — | −6.9 | — | — |
| Do = −2.0 | −4.5 | −4.4 | −4.4 | −4.4 | −4.4 |
| Do = 0 | 0.6 | 0.8 | 1.0 | 1.0 | 1.1 |
| Do = 0.5 | 1.6 | 1.7 | 1.9 | 1.9 | 2.1 |
| Do = 2.0 | 4.8 | 4.9 | 5.1 | 5.4 | 5.4 |
| Do = 3.0 | — | — | 7.5 | — | — |
| Do = 4.0 | 9.4 | 9.8 | 10.1 | 10.5 | 10.6 |

The maximum magnification in a region within a circle of 40 mm diameter around a point lying 4 mm vertically below the centration point is still very small. Table 4 shows the magnification for some embodiments of the invention.

TABLE 4

Maximum Magnification [%]

| | Add = 1.0 | Add = 1.5 | Add = 2.0 | Add = 2.5 | Add = 3.0 |
|---|---|---|---|---|---|
| Do = −4.0 | −5.6 | −5.1 | −4.2 | −3.5 | −2.8 |
| Do = −3.0 | — | — | −2.33 | — | — |
| Do = −2.0 | −2.1 | −1.4 | −0.3 | 1.0 | 2.3 |
| Do = 0 | 3.3 | 4.7 | 6.5 | 8.0 | 9.8 |
| Do = 0.5 | 5.3 | 6.7 | 8.0 | 8.8 | 9.8 |
| Do = 2.0 | 10.6 | 11.8 | 13.7 | 15.0 | 17 |
| Do = 3.0 | — | — | 17.0 | — | — |
| Do = 4.0 | 18.0 | 19.0 | 21.0 | 23.0 | 25.0 |

The spectacle lenses of the invention, as shown in the Tables and the Figures, have been computed for a wearing position. For computing a progressive surface in a wearing position, a wearing situation is established. This relates either to a particular user for whom the various parameters of the respective wearing situation have been specifically determined and the progressive surface separately computed and fabricated, or to mean values as described in DIN 58 208, Part 2.

What is claimed:

1. Spectacle lens comprising a distance portion designed for viewing at large distances, which include infinity;

a near portion designed for viewing at short distances, including reading distances; and a progressive zone disposed between the distance portion and the near portion, in which the power of the spectacle lens increases from a value at a distance reference point located in the distance portion to a value at the near reference point located in the near portion along a curved principal line veering towards the nose, by an addition power;

wherein the magnification varies monotonically from an extreme point in all radial direction;

wherein the difference between the magnifications at the distance and near reference points is small, and wherein the absolute difference of the magnification between the near and the distance reference point is equal to or smaller than the values in the following table from which intermediate values can be obtained by linear interpolation:

|  | Add = 1.0 | Add = 1.5 | Add = 2.0 | Add = 2.5 | Add = 3.0 |
|---|---|---|---|---|---|
| Do = −4.0 | 1.2 | 1.2 | 1.8 | 2.8 | 3.7 |
| Do = −2.0 | 1.0 | 1.6 | 2.9 | 4.0 | 5.0 |
| Do = 0 | 2.5 | 3.2 | 4.2 | 5.3 | 6.4 |
| Do = 2.0 | 4.1 | 4.7 | 5.3 | 6.3 | 7.8 |
| Do = 4.0 | 5.8 | 5.9 | 6.3 | 7.7 | 8.8 | where the addition power Add is the difference of the mean powers when worn by a user in the near and distance reference points, and $D_0$ is the mean power when worn by a user at the distance reference point.

2. Spectacle lens according to claim 1, wherein within a circle having a diameter of 40 mm around a point lying 4 mm below the centration point, the magnitude of the magnification at the distance reference point is smaller than or equal to the magnitudes of the values in the following table from which intermediate values can be obtained by linear interpolation:

|  | Add = 1.0 | Add = 1.5 | Add = 2.0 | Add = 2.5 | Add = 3.0 |
|---|---|---|---|---|---|
| Do = −4.0 | −6.6 | −6.5 | −6.6 | −6.6 | −6.6 |
| Do = −2.0 | −3.1 | −3.1 | −3.1 | −3.1 | −3.1 |
| Do = 0 | 0.8 | 1.1 | 1.1 | 1.3 | 1.3 |
| Do = 2.0 | 5.5 | 5.5 | 5.6 | 5.9 | 5.9 |
| Do = 4.0 | 10.4 | 10.8 | 11.0 | 11.1 | 11.2 | where the addition power Add is the difference of the mean powers when worn by a user in the near and distance reference points, and $D_0$ is the mean power when worn by a user at the distance reference point.

3. Spectacle lens according to claim 1, wherein within a circle having a diameter of 40 mm around a point lying 4 mm below the centration point, the magnitude of the magnification at the near reference point is smaller than or equal to the magnitudes of the values in the following table from which intermediate values can be obtained by linear interpolation:

|  | Add = 1.0 | Add = 1.5 | Add = 2.0 | Add = 2.5 | Add = 3.0 |
|---|---|---|---|---|---|
| Do = −4.0 | −7.6 | −6.5 | −5.0 | −4.0 | −3.1 |
| Do = −2.0 | −2.8 | −1.8 | −0.5 | 1.0 | 2.0 |
| Do = 0 | 3.1 | 4.2 | 5.2 | 6.4 | 7.5 |
| Do = 2.0 | 9.5 | 10.2 | 10.8 | 12.2 | 13.5 |
| Do = 4.0 | 16.2 | 16.7 | 17.2 | 18.7 | 20.0 | where the addition power Add is the difference of the mean powers when worn by a user in the near and distance reference points, and $D_0$ is the mean power when worn by a user at the distance reference point.

4. Spectacle lens according to claim 1, wherein within a circle having a diameter of 40 mm around a point lying 4 mm below the centration point, the magnitude of the minimum magnification is greater than or equal to the magnitudes of the values in the following table from which intermediate values can be obtained by linear interpolation:

|  | Add = 1.0 | Add = 1.5 | Add = 2.0 | Add = 2.5 | Add = 3.0 |
|---|---|---|---|---|---|
| Do = −4.0 | −10 | −10 | −10 | −10 | −10 |
| Do = −2.0 | −4.8 | −4.8 | −4.8 | −4.8 | −4.8 |
| Do = 0 | 0.5 | 0.7 | 0.8 | 0.9 | 1.0 |
| Do = 2.0 | 4.6 | 4.7 | 5.0 | 5.2 | 5.3 |
| Do = 4.0 | 9.3 | 9.6 | 9.9 | 10.3 | 10.4 | where the addition power Add is the difference of the mean powers when worn by a user in the near and distance reference points, and $D_0$ is the mean power when worn by a user at the distance reference point.

5. Spectacle lens according to claim 1, wherein within a circle having a diameter of 40 mm around a point lying 4 mm below the centration point, the magnitude of the maximum magnification is smaller than or equal to the magnitudes of the values in the following table from which intermediate values can be obtained by linear interpolation:

|  | Add = 1.0 | Add = 1.5 | Add = 2.0 | Add = 2.5 | Add = 3.0 |
|---|---|---|---|---|---|
| Do = −4.0 | −5.4 | −4.9 | −4.1 | −3.3 | −2.6 |
| Do = −2.0 | −2.0 | −1.2 | −0.1 | 1.2 | 2.4 |
| Do = 0 | 3.5 | 4.8 | 6.6 | 8.2 | 10.0 |
| Do = 2.0 | 10.8 | 12.0 | 13.9 | 15.2 | 17.2 |
| Do = 4.0 | 18.2 | 19.2 | 21.2 | 23.2 | 25.2 | where the addition power Add is the difference of the mean powers when worn by a user in the near and distance reference points, and $D_0$ is the mean power when worn by a user at the distance reference point.

6. Spectacle lens according to claim 1, wherein within a circle having a diameter of 40 mm around a point lying 4 mm below the centration point, the absolute difference of the maximum and minimum magnification is smaller than or equal to the magnitudes of the values in the following table from which intermediate values can be obtained by linear interpolation:

|  | Add = 1.0 | Add = 1.5 | Add = 2.0 | Add = 2.5 | Add = 3.0 |
|---|---|---|---|---|---|
| Do = −4.0 | 4.6 | 4.6 | 5.5 | 6.2 | 6.9 |
| Do = −2.0 | 2.5 | 3.2 | 4.3 | 5.5 | 6.7 |
| Do = 0 | 3.0 | 4.0 | 5.6 | 7.1 | 8.8 |
| Do = 2.0 | 6.0 | 7.1 | 8.7 | 9.8 | 11.7 |
| Do = 4.0 | 8.7 | 9.4 | 11.1 | 12.7 | 14.6 | where the addition power Add is the difference of the mean powers when worn by a user in the near and distance reference points, and $D_0$ is the mean power when worn by a user at the distance reference point.

* * * * *